Aug. 14, 1962  J. B. SLAUGHTER  3,048,917
TOOL FOR APPLYING CRAWLER TREADS
Filed June 9, 1959  2 Sheets-Sheet 2
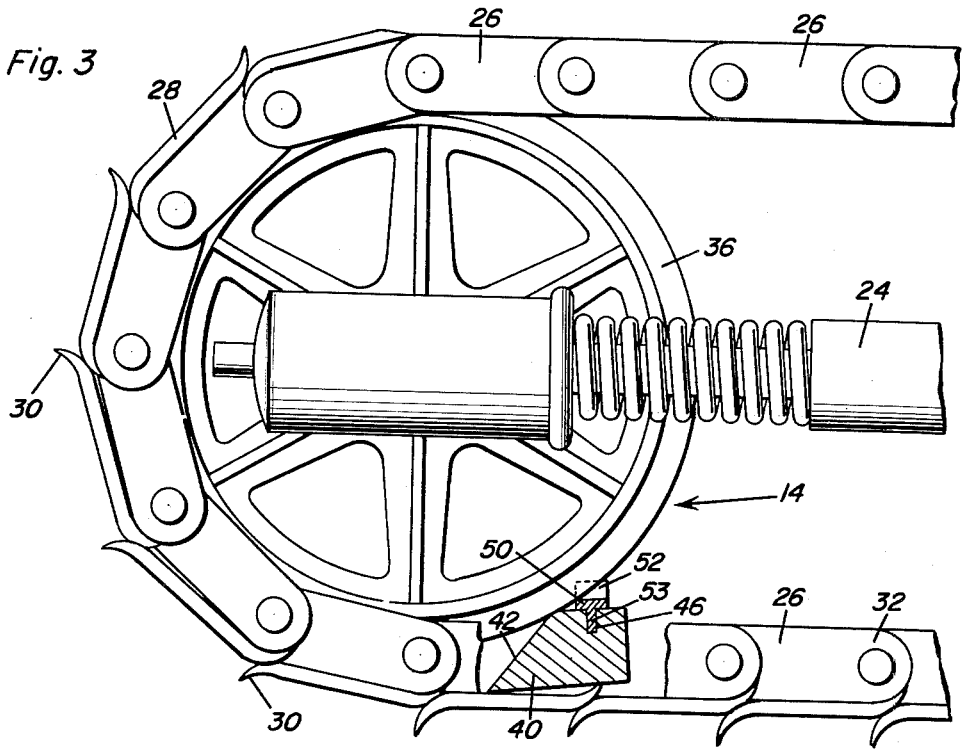
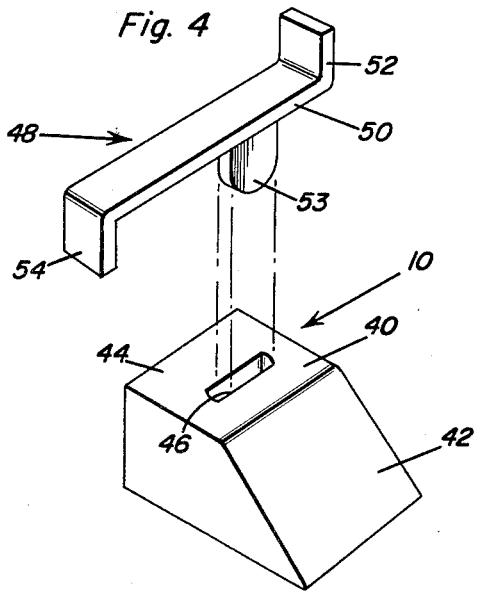
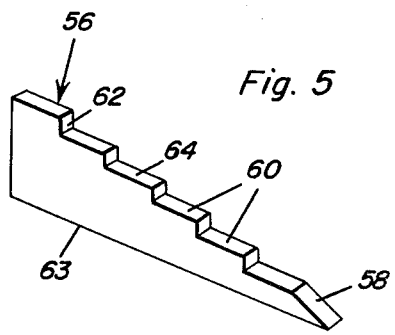
James B. Slaughter
INVENTOR.

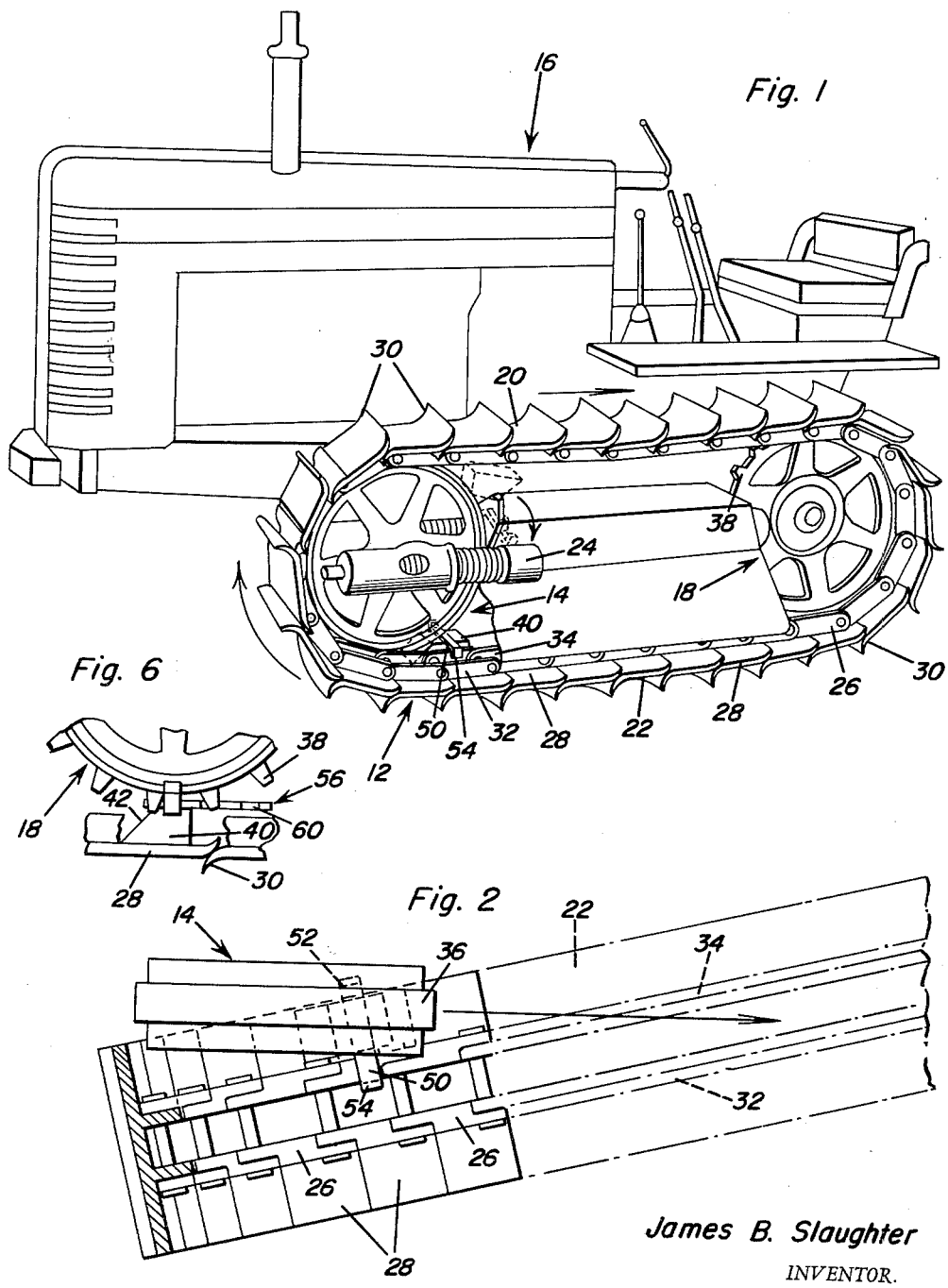

United States Patent Office 3,048,917
Patented Aug. 14, 1962

3,048,917
TOOL FOR APPLYING CRAWLER TREADS
James B. Slaughter, 422 Reservoir Ave., Central City, Ky.
Filed June 9, 1959, Ser. No. 819,178
8 Claims. (Cl. 29—200)

This invention relates to a novel and useful tool designed for applying crawler treads to tractors, and more particularly relates to a tool for applying crawler treads which necessitates only the attachment of the tool to the crawler tread and to the derailed sprocket or idler wheel, and thereafter requiring only the operation of the tractor in a direction so as to move the derailed wheel along the lower reach of the tractor crawler tread.

In the past when a crawler tread become derailed from a tractor, it was necessary to loosen a clamp holding the adjusting screw for the idler wheel, manipulate the adjusting screw to position the idler wheel closer to the sprocket wheel, which manipulation requires a wrench with a five foot extension for leverage, and then use a bar or timber on the pads of the tread as a lever while reversing the tractor in an attempt to guide the crawler tread beneath the derailed wheel. If these steps were not successful in applying the crawler treads, the next step was to remove the master pin from the crawler tread so as to have two free ends with which to work. The tractor was then jacked up so that the free ends of the crawler tread could be placed about the derailed wheel. After the crawler tread had been replaced by this method, it was often necessary to employ a special tool between the ends of the crawler tread to urge the ends together so that the master pin could then be replaced before the tractor could be used.

The main object of this invention is to provide a tool for applying or rerailing tractor crawler treads which necessitates only the positioning of the tool between the derailed wheel and the crawler treads and the operation of the tractor in a direction to move the derailed wheel along the lower reach of the tractor crawler treads.

A further object of this invention, in accordance with the preceding object, is to provide a means for compensating for the normal wear occurring between the idler or sprocket wheel and the confronting sides of the spaced rails of the crawler tread.

A further object, in accordance with the preceding object, is to provide a tool that can be used to apply crawler treads of a tractor to a derailed sprocket wheel, an attachment for the tool being used to compensate for the relative narrow teeth of the sprocket wheel.

Still another object, in accordance with the preceding object, is to provide an attachment for the crawler tread replacing tool that may be used to provide traction between a derailed sprocket wheel and the crawler treads to which it is being applied.

A final object to be specifically enumerated herein is to provide a tool for applying tractor crawler treads that will conform to conventional forms of manufacture, be relatively inexpensive to produce, and effective and quick in the replacing for re-railing of a tractor crawler tread about a derailed idler or sprocket wheel.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an enlarged perspective view of a tractor having a conventional form of crawler treads shown with the forward or idler wheel thereof derailed from the treads and the tool comprising the instant invention shown in position to replace a crawler tread about the derailed wheel, the position of the tool after having replaced the crawler tread about the derailed wheel being shown in phantom lines;

FIGURE 2 is a diagrammatic view in plan showing the relative positions of the idler wheel, the crawler treads, and the tool in position for the replacement of the crawler treads about the derailed wheel;

FIGURE 3 is an enlarged detail side elevational view of the idler wheel of the tractor with parts of the crawler tread being broken away and the tool shown in section in position to rerail the idler wheel between the guide rails of the crawler tread;

FIGURE 4 is an exploded perspective view of the tool showing the complementary projection and recess removably positioning and securing the tool parts together;

FIGURE 5 is an enlarged perspective view of the wedge attachment for the tool adapting the latter to be used to re-rail a sprocket wheel having relatively narrow sprocket teeth thereon;

FIGURE 6 is a detail side elevational view of the tool rerailing the crawler tread about a sprocket wheel, parts of the tread being broken away and the wedge attachment being shown being mounted between adjacent sides of the tool and the relatively narrow sprocket teeth.

With attention now drawn more particularly to FIGURES 1 and 4, the tool comprising the instant invention is generally designated by the reference numeral 10 and is shown mounted in position adjacent the crawler tread and idler wheel of a conventional form of tractor, each being generally designated by the reference numeral 12, 14 and 16 respectively. The tractor 16 is also provided with a sprocket wheel generally designated by the reference numeral 18 and the crawler tread 12 is entrained about the idler wheel 14 and the sprocket wheel 18 having upper and lower longitudinally extending reaches 20 and 22 respectively.

The spaced relation of the idler wheel 14 from the sprocket wheel 18 is adjusted by means of an adjusting mechanism 24, which, without the use of the present invention, has to be loosened to provide the necessary slack to enable the crawler tread 12 to be entrained about the idler and sprocket wheels 14 and 18.

The conventional form of tractor crawler tread is usually composed of a series of interconnected and pivotally secured spaced links 26 with each pair of spaced links having secured thereto a tread pad 28. The tread pads 28, if so desired, are formed with ground engaging elements 30 so as to provide additional traction for the tractor 16. The pivotally connected opposite ends of the links 26 are aligned and form a pair of spaced rails 32 and 34. The spaced rails 32 and 34 project upwardly from the pads 28 and form a pair of rails between which the guide flange 36 of the idler wheel 14 and the sprocket teeth 38 of the idler wheel 18 are positioned so as to maintain the crawler tread 12 entrained about the idler and sprocket wheels 14 and 18.

Under some conditions, during the use of the tractor 16, dirt, rocks, or other foreign material may become lodged between a portion of the crawler tread 12 and either one of the idler or sprocket wheels 14 and 18 with the result that the tractor crawler tread 12 is derailed from one of the wheels about which it is entrained. To facilitate the easy replacement of the tractor crawler tread 12 about the wheel which has become derailed, the tool 10 is utilized.

The tool 10 comprises a block 40 which may be constructed either of a solid piece of material or by the joining of six sides of a sufficiently rigid material in any fashion such as by welding to provide the block of the desired shape. The block 40 is generally parallelepiped in shape but has one inclined end 42. The top or upper surface 44 of the block 40 is provided with a suitable recessed pocket 46, the purpose of which is to be hereinafter set forth.

In use, the block 40 is positioned on the upper surface of the pads 28 in the lower reach 22 on that side of the rails 32 and 34 adjacent the derailed wheel, such as idler wheel 14 in FIGURE 1, with the inclined end 42 in contact with the lower portion of the peripheral surface of the guiding flange 36 on the side of the idler wheel 14 adjacent the sprocket wheel 18.

It is to be understood that the idler wheel 14 has been previously placed upon the same upper surfaces of the pads 28 of the lower reach 22 by reversing the tractor 16 and turning it in a direction away from the derailed track or crawler treads 12. This movement will cause the peripheral surface of the idler wheel 14 to ride upon the crawler treads 12.

With the wedge block 40 so positioned under the lower portion of the idler wheel 14 as seen in FIGURE 1, the tractor is then reversed by applying power to the sprocket wheel 38 in a reverse direction with the crawler tread 20 on the opposite side of the tractor 16 braked in a stationary position. In a few instances this use of the block 40 alone may be sufficient to raise the guiding flange 36 of the idler wheel 14 above the upper surface of rails 32 and 34 so that the turning movement of the tractor 16 will in effect slide the idler wheel 14 into position with its guide flange 36 between rails 32 and 34 as the block 40 travels from the lower reach 22 to the upper reach 20.

In many instances however, the turning movement of the tractor 16 is not sufficient to position the flange 36 between the rails 32 and 34, and it becomes necessary to provide a means for retaining the adjacent side surfaces of the guide rail 34 and the idler wheel 14 in contacting relation at the point adjacent the wedge block 40 so that as the idler wheel 14 moves along the lower reach 22 of the crawler tread 12, the crawler tread 12 adjacent the lower portion the idler wheel will have a lateral force applied thereto as the block 40 moves to the upper reach 20 so as to position the rails 32 and 34 on opposite sides of the idler wheel flange 36 at the forwardmost part of the lower reach 22.

The means for retaining the adjoining side surfaces of the rail 34 and the idler wheel 14 in contacting relation comprises an elongated bar generally referred to by the reference numeral 48 having a center portion 50 and one end portion 52 formed at right angles to the center portion 50 and extending from one side thereof and the other end portion 54 extending at right angles thereto and projecting from the other side of the center portion 50. Depending from the center portion 50 is a projection 52 which is complementary with and slidably received within recessed pocket 46 to position the retaining member 48 upon the upper surface 44 of the block 40.

With attention now drawn more particularly to FIGURES 1 and 2, it will be noted that the one end portion 52 is adapted to engage the remote side of the guiding flange 36 while the other end portion 54 engages the remote inner surface of the guide rail 34.

In further explanation of the operation of the tool 10, as the idler wheel 14 is moved over the block 40 and the retaining means 48, the lowermost surface of the guiding flange 36 is raised above the upper surface of the guide rails 34 and 32. With attention now drawn more particularly to FIGURE 2, it will be noted that further movement of the idler wheel 14 along the lower reach 22 will cause the outer surface of the flange 36 to rest upon the upper surface of the rail 34. Further movement of the idler wheel 14 along the lower reach 22 then moving the guiding flange 36 into position between the guide rails 32 and 34, whereupon the leading edge or surface of the idler wheel is then correctly positioned at one point along the crawler tread 12, that point, upon continuing rearward movement of the tractor 16 finally becomes a part of the upper reach 20 as the crawler tread 12 is completely entrained about the idler wheel 14 with the guide flange 36 positioned between the guide rails 32 and 34, the tool 10 then falling from engagement with the crawler tread 12 and the idler wheel 14 as shown in phantom lines in FIGURE 1.

With attention now drawn more particularly to FIGURES 5 and 6, when the tool 10 is to be used to entrain the crawler tread 12 about the sprocket wheel 38, a wedge generally referred to by the reference numeral 56 is used to compensate for the relative narrow sprocket teeth 38 in relation to the broad guide flange 36. The wedge 56 is wedge-shaped and has an inclined side 58 with a plurality of steps 60 formed therein, each step 60 having one surface 62 perpendicular to the side of the wedge 56 opposite the inclined side 58 and another surface 64 substantially parallel to the side opposite the inclined side 58.

The opposite side 63 is positioned in contacting relation with the remote surface of the idler teeth 38 and the other surface 64 of the appropriate step 60 is positioned in contacting relation with the adjacent surface of the end portion 52 so as to ensure that the block 40 will be positioned and maintained in position with the adjacent side surfaces of the sprocket wheel 18 and the rail 34 in contacting relation.

Although the tool 10 has been shown in the drawings and described herein for replacing a tractor crawler tread 12 which has been derailed to the outside of a sprocket or idler wheel, it is to be understood that the tool 10 will perform equally as well in rerailing the crawler treads 12 whether the tread 12 has become derailed from either side of a sprocket wheel or idler wheel.

With further reference to FIGURE 6 of the drawings, it will be noted that not only is the tool 10 adapted to replace the crawler tread 12 about a sprocket wheel 38, but that the retaining means 48 also provides traction for the sprocket wheel so that the latter may be powered and moved along the crawler tread 12 during the process of rerailing the latter about the sprocket wheel 18.

Thus it can be seen that herein is described a tool which may be very readily used to rerail or apply tractor crawler treads to either an idler or sprocket wheel of a conventional form of tractor.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A tool for rerailing crawler treads comprising a wedge block adapted to be positioned between the sprocket and idler wheels of a crawler vehicle adjacent the derailed wheel thereof on the upper surface of the tread pads in the lower reach of the crawler tread and in cooperating engagement with said derailed wheel, a narrow elongated bar secured to said wedge block and extending transversely thereof and having one end adapted to engage the derailed wheel and the other end adapted to engage the adjacent guide rail of the crawler tread with the mid portion of said bar extending beneath said wheel and over said guide rail, said bar retaining that portion of said rail adjacent the derailed wheel in contacting relation with the latter, said wedge block with said bar being of sufficient height so as to be adapted to raise the guiding circumferential flange of the idler wheel or the sprocket teeth of the sprocket wheel above the upper edge of the adjacent rail upon movement of the wheel over said block and retaining means whereby as the derailed wheel is rotated and said tool rotates therewith said wheel will roll over said wedge block and the derailed wheel will be lifted above the adjacent tread rail and positioned between the latter and the other tread rail.

2. The combination of claim 1 including a recessed pocket formed in the upper surface of said wedge block, said elongated bar having a depending projection thereon rockably received in said pocket.

3. The combination of claim 1 including an inclined surface on the wedge block adapted to be positioned juxtaposed to the circumferential surface of said derailed wheel.

4. The combination of claim 1 including a wedge adapted to be positioned between said one end of said retaining means and the adjacent side of the derailed wheel compensating for wear of said derailed wheel on said rails.

5. The combination of claim 4 including a plurality of step recesses formed in one convergent side of said wedge with one side of each recess substantially parallel to the other convergent side.

6. The combination of claim 1 including a recessed pocket formed in the upper surface of said wedge block, said flat and narrow elongated bar having a depending projection thereon rockably received in said pocket, said one end of said bar terminating in a right angle upwardly directed flange and the other end terminating in a downwardly directed right angle flange, said projection depending from the underside of said bar whereby said bar will be positioned across the upper surface of said block and afford traction to the teeth of a derailed sprocket wheel.

7. The combination of claim 1 including a recessed pocket formed in the upper surface of said wedge block, said bar comprising a flat and narrow elongated bar having a depending projection thereon slidingly received in said pocket, said one end of said retaining means terminating in a right angle upwardly directed flange and the other end terminating in a downwardly directed right angle flange, said projection depending from the underside of said bar whereby said bar will be positioned across the upper surface of said block and afford traction to the teeth of a derailed sprocket wheel, an inclined surface on the wedge block adapted to be positioned juxtaposed to the circumferential surface of said derailed wheel.

8. The combination of claim 7 including a wedge adapted to be positioned between said one end of said retaining means and the adjacent side of the derailed wheel compensating for wear of said derailed wheel on said rails, a plurality of step recesses formed in one convergent side of said wedge with one side of each recess substantially parallel to the other convergent side.

References Cited in the file of this patent

UNITED STATES PATENTS

| | | |
|---|---|---|
| 1,364,744 | Gallagher | Jan. 4, 1921 |
| 1,377,925 | Rattigan | May 10, 1921 |
| 1,415,865 | Brown | May 16, 1922 |
| 1,645,669 | Stevenson | Oct. 18, 1927 |
| 1,714,187 | Pacy | May 21, 1929 |
| 2,304,840 | McGrady | Dec. 15, 1942 |